United States Patent [19]

Leutwyler

[11] 4,397,251
[45] Aug. 9, 1983

[54] FOOT-OPERATED CONTROL DEVICE FOR ELECTRICALLY OPERATED APPLIANCES

[75] Inventor: Robert Leutwyler, Boppelsen, Switzerland

[73] Assignee: Fritz Gegauf Aktiengesellschaft Bernina-Nähamaschinenfabrik, Steckborn, Switzerland

[21] Appl. No.: 268,845

[22] Filed: Jun. 1, 1981

[30] Foreign Application Priority Data

Jun. 2, 1980 [CH] Switzerland .................. 4251/80

[51] Int. Cl.³ ............................. D05B 69/18
[52] U.S. Cl. ................................. 112/277
[58] Field of Search ............ 112/277, 275, 220; 338/108, 176; 318/551

[56] References Cited

U.S. PATENT DOCUMENTS 3,364,452  1/1968  Thompson et al. ......... 112/277 X
4,299,182  10/1981 Tanaka ...................... 112/277

Primary Examiner—Peter P. Nerbun
Attorney, Agent, or Firm—Birch, Stewart, Kolasch & Birch

[57] ABSTRACT

A control device comprising a housing having a bottom pin, and a cable drum mounted on said bottom pin said cable drum being stressed by a reset spring 11. The cable drum 6 is radially and axially guided, at its periphery, by offset supporting rollers (1c). A regulating member 8a of a potentiometer 8 is fixedly installed on the hub 6a of the cable drum 6. The tap pins 8b of the potentiometer 8 are arranged on the slide 9 axially movable in the hub. The slide 9 is connected with a treadle 3 by a tappet 10 provided with a ball-and-socket joint 9b, 10a. The treadle 3 is mounted to the housing 1 to be vertically pivotable by means of two pivots beside the cable drum 6. The blocking means for the cable drum 6, actuatable by remote control, is located between the two pivots. The device of the present invention is especially suited for the control of electrical household sewing machines.

7 Claims, 2 Drawing Figures

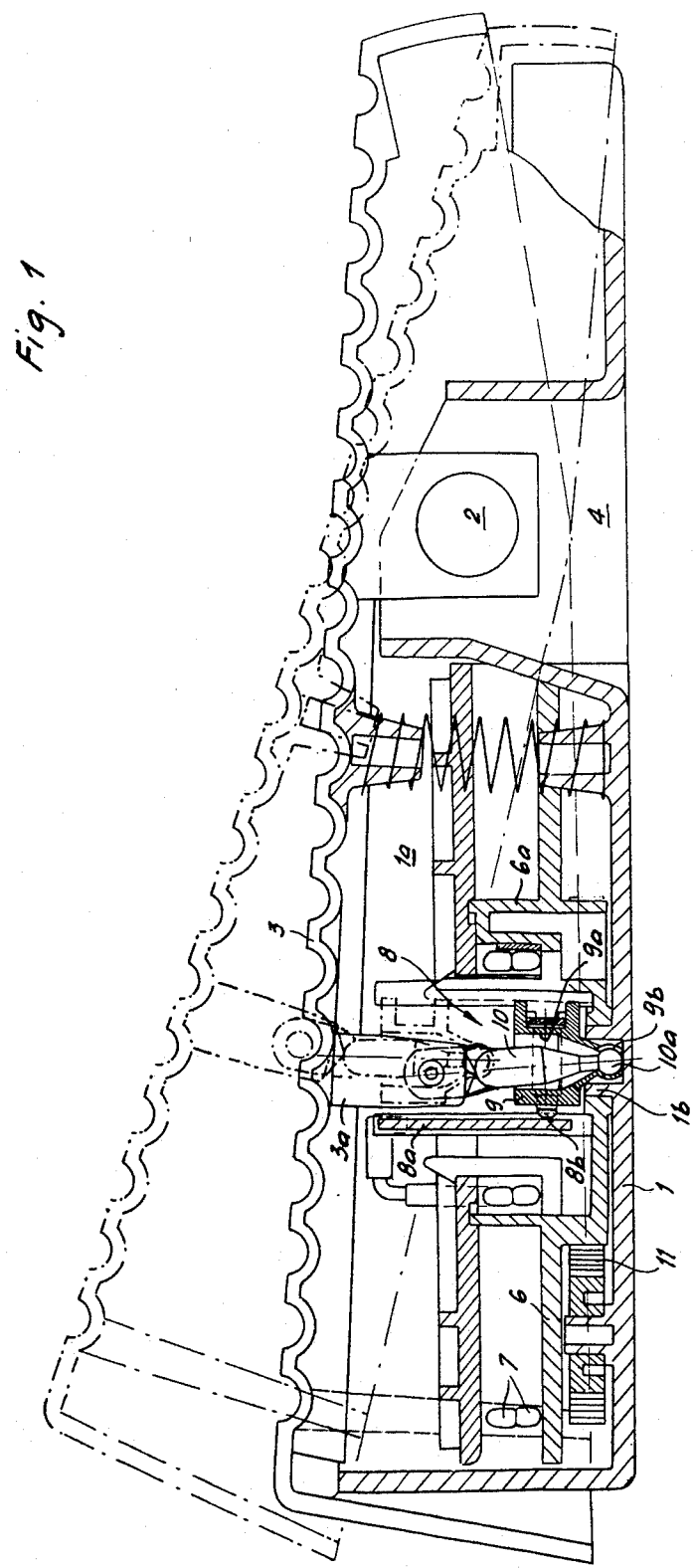

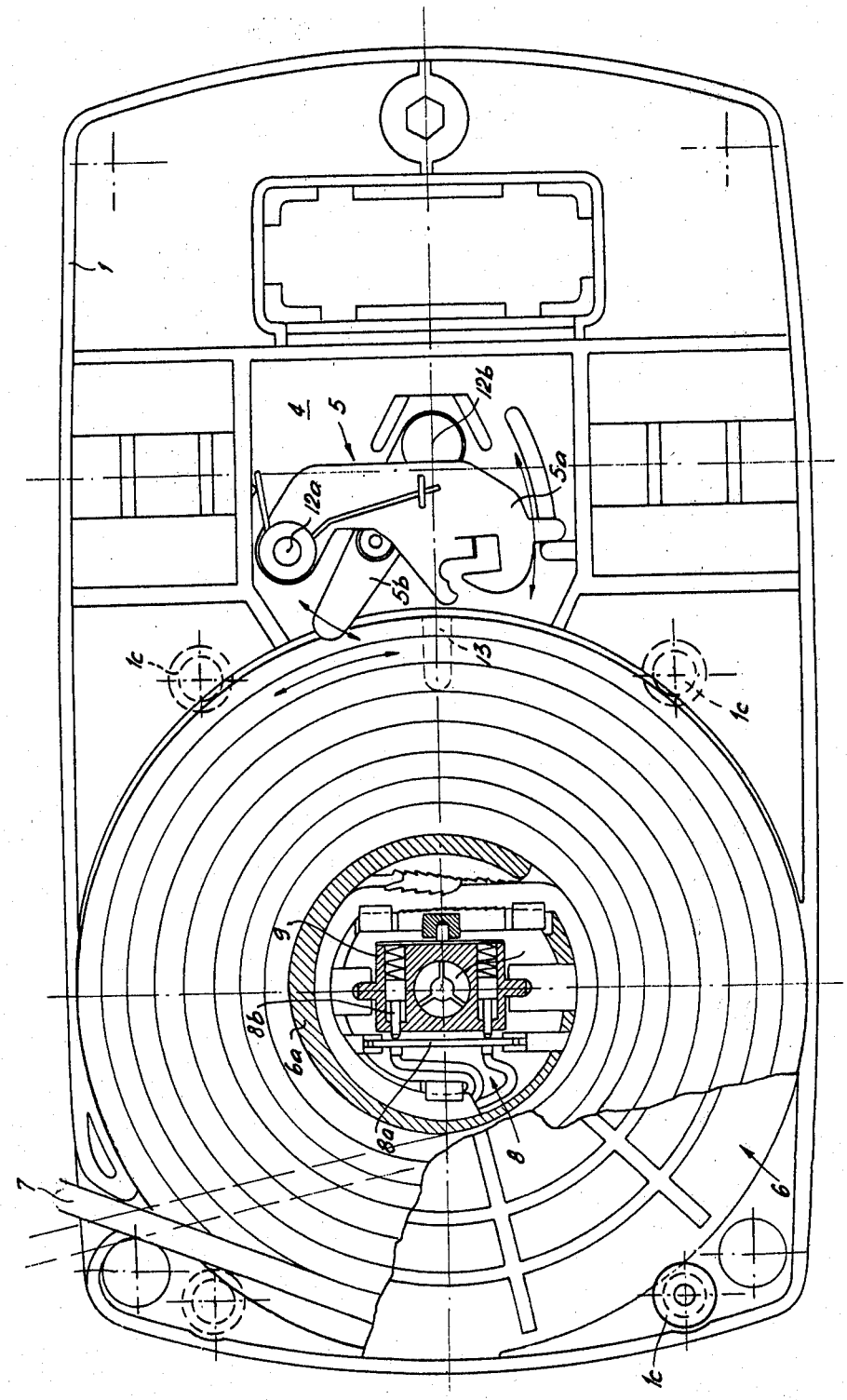

FOOT-OPERATED CONTROL DEVICE FOR ELECTRICALLY OPERATED APPLIANCES

BACKGROUND AND SUMMARY OF THE INVENTION

The present invention relates to a foot-operated control device with a regulating unit, an installed cable drum and a reset spring for electrically driven appliances. More particularly, the present invention is directed to a foot-operated control device which is used with household appliances, e.g., sewing machines.

In conventional control devices of this type, current is transmitted via relatively movable parts, for example carbon brushes, wiper contacts, etc., which leads to the wear and tear of various elements due to sparking caused by poor transmitting conditions produced by soiling or oxidation. Since in such control devices a reset spring is customarily provided which effects the retraction of the pulled-out cable, a blocking means must be included which fixes the cable to the pulled-out length. In the control devices known heretofore, these blocking means are, in most cases, comprised of clamping-type safety catches which can be triggered by manual or remote operation. Since these clamping-type safety catches are not released by positive switchover control by the cable drum proper, additional manipulations are required which lead to a cumbersome operation, especially in the present instance where foot-operated devices are involved.

In case of foot-operated control devices forming accessories to a household appliance, the structural size is frequently limited because of space limitations. Furthermore, the installation of a cable drum into such appliances causes some difficulties for the reasons that it is difficult to provide a suitable arrangement of the drum and the regulator unit, especially in control devices containing a treadle pivotable about an axis essentially disposed underneath the ankle joint, since only the space lying in front of the axis is available and can be utilized for the installation of the cable drum and the regulator unit.

Accordingly, an object of the present invention is to provide a control device of the type mentioned hereinabove wherein, by the avoidance of relatively movable current-transmitting elements, a flawless current passage is ensured without producing undesirable wear and wherein the control device makes it possible to effect a space-saving, compact construction and simple manipulation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The control device of the present invention comprises a housing with a receiving chamber for the cable drum which is rotatable about a fixed axis, a regulator member of a potentiometer fixedly installed in the hub portion of the cable drum, and a treadle supported outside of the chamber at the housing, said treadle carrying a slide, which is connected to the treadle in an articulated and rotatable fashion, is vertically guided in the drum, and is provided with the tap contacts of the potentiometer, said slide being fixedly connected with the regulator member in a nonrotational manner.

Because of this type of construction, there is no relative movement between the tap elements and the regulator member of the potentiometer fixedly joined to the cable drum, during the extraction or retraction of the cable causing the revolving of the cable drum. The treadle movement is transmitted via the tappet to the vertically movable slide. The treadle, which is suitably fashioned as a housing lid, is advantageously supported at the housing by two axle stubs leaving between them a free housing space located beside the cable drum. The blocking means for the cable, activatable by remote control and cooperating with the periphery of the cable drum, is disposed in this free housing space. This permits an especially compact construction of the device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a vertical longitudinal section through the device of the present invention; and FIG. 2 is a top view of the device with the treadle having been removed.

DETAILED DESCRIPTION OF THE INVENTION

The device of the present invention has a housing of approximately rectangular shape in the horizontal projection thereof. A treadle 3, serving as a lid for the housing, is mounted to the housing 1 by means of two pivots 2. According to FIG. 2, a blocking means 5, activatable by remote control, is installed in the housing space 4 between the two pivots 2. The blocking means cooperates with the cable drum 6 which is rotatably mounted in the housing 1 in a chamber 1a thereof, lying in front of the two pivots 2. The cable drum 6 is supported with its hub 6a on a bottom pin 1b of the housing 1 and is guided axially and radially on the topside of the housing by means of four supporting rollers 1c. The cable drum 6, provided with the cable 7, is guided axially and radially at its offset periphery by four correspondingly offset guide rollers 1c. The inner cable end is introduced into the hub 6a of the cable drum 6 and clamped in place at that location. A potentiometer 8, connected to the cable 7, is installed in the hub 6a. The regulator member 8a which is fixedly joined to the hub 6a and pertains to the potentiometer is tapped by carbon brushes 8b disposed on the inside facing of the drum axis, said carbon brushes being provided on a slide 9, vertically guided in the drum hub 6a. The slide 9 has a central bore 9a which is tapered conically in the downward direction and which terminates in a ball socket formed by tongues 9b. The ball 10a of the ball-and-socket joint provided at the lower end of a tappet 10 is seated in this socket. The tappet 10 is operatively connected to an extension 3a of the treadle 3. A reset or restoring spring 11 engages in a conventional way on the hub portion of the cable drum 6 facing the housing bottom, said spring stressing the cable drum 6 along the lines of winding up the cable 7.

It can be readily seen from the above discussion that, during extraction or retraction of the cable 7, no relative movement whatever takes place between the regulator member 8a and the tap contacts 8b of the potentiometer 8, which latter rotates with the cable drum 6.

The foot-operated, spring-biased treadle 3 determines, via the tappet 10 and the slide 9 connected with the treadle via the ball-and-socket joint 9b, 10a, the tapping level of the carbon brushes 8b at the regulator member 8a of the potentiometer 8.

The blocking means 5, which can be triggered by remote control and which is disposed between the pivots 2 in the space 4, consists of two intersecting, superimposed oscillating levers 5a, 5b. The two levers 5a, 5b are spring-biased and can swing about the axis 12a, 12b. One of the mutually engaging levers, 5a, serves for blocking or releasing the other lever 5b cooperating, in case of blockage, with a recess 13 of the cable drum.

Thanks to this type of construction, it is ensured that the result is not only an especially compact device, which can be readily operated and provides a perfect cable blockage, but also a flawless current transmission is achieved thanks to the potentiometer installed in the hub of the cable drum.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A foot-operated control device for a sewing machine which comprises
    a housing containing a receiving chamber,
    a cable drum rotatably disposed within said receiving chamber about a fixed axis, said cable drum having a hub portion
    a regulator member of a potentiometer fixedly installed on said hub portion, and
    a treadle member pivotally supported by said housing, said treadle member carrying a slide member rotatably and operatively connected thereto, said slide member containing top contacts of said potentiometer and being vertically guided in said cable drum, said slide member being nonrotationally connected with the regulator member.

2. The foot-operated control device of claim 1 wherein the housing has a bottom pin, said cable drum being mounted on said bottom pin, and a reset spring positioned in said housing to stress said cable drum against said bottom pin.

3. The foot-operated control device according to claim 1, wherein the slide member has a ball socket and the treadle is provided with an extension means which is rotatably and pivotally connected to a tappet containing a ball head at the lower end thereof, said ball head being received by said ball socket.

4. The foot-operated control device according to claim 3, wherein the treadle is pivotally mounted by means of two horizontal, axially spaced-apart pivot means outside of the receiving chamber.

5. The foot-operated control device according to claim 4, wherein a blocking means, which can be triggered by remote control, is installed in the housing between said two pivots, said blocking means cooperating with the cable drum.

6. The foot-operated control device according to claim 5, wherein the blocking means contains two superimposed, intersecting, spring-biased oscillating levers which, for the purpose of blocking the cable drum, come into releasable engagement with each other.

7. The foot-operated control device according to claims 1, 2, 3, 4, or 5 wherein the cable drum is guided with its hub on a bottom pin of the housing and is guided axially and radially on the periphery by means of offset supporting rollers.

* * * * *

UNITED STATES PATENT AND TRADEMARK OFFICE
CERTIFICATE OF CORRECTION

PATENT NO. : 4,397,251
DATED : August 9, 1983
INVENTOR(S) : Robert LEUTWYLER

It is certified that error appears in the above–identified patent and that said Letters Patent are hereby corrected as shown below:

In the Heading of the Patent, under the category "[73] Assignee:" change "Fritz Gegauf Aktiengesellschaft Bernina-Nähamaschinenfabrik, Steckborn, Switzerland" to --Fritz Gegauf Aktiengesellschaft Bernina-Nähmaschinenfabrik, Steckborn, Switzerland--.

Signed and Sealed this

Sixth Day of March 1984

[SEAL]

Attest:

GERALD J. MOSSINGHOFF

Attesting Officer

Commissioner of Patents and Trademarks